C. T. PAINTER.
CLUTCH.
APPLICATION FILED NOV. 16, 1907. RENEWED SEPT. 25, 1908.
904,358.
Patented Nov. 17, 1908.
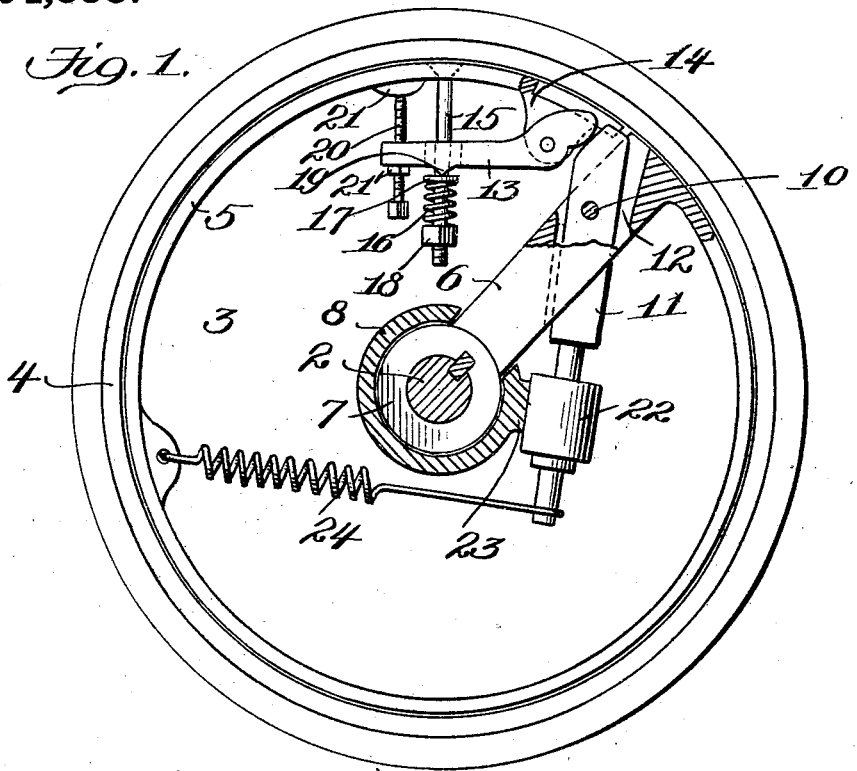
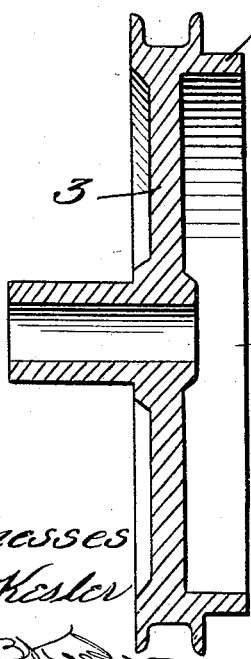
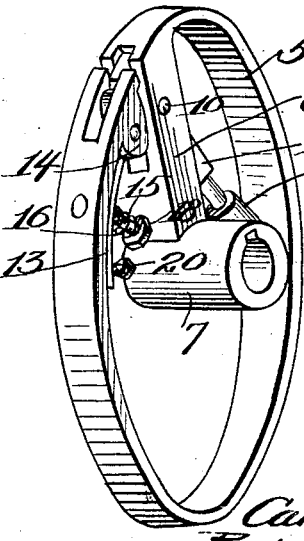
Witnesses
C. D. Kesler
Inventor
Carl T. Painter
By James L. Norris
Atty

UNITED STATES PATENT OFFICE.

CARL T. PAINTER, OF CHATTANOOGA, TENNESSEE, ASSIGNOR TO PATTEN MANUFACTURING COMPANY, OF CHATTANOOGA, TENNESSEE, A CORPORATION OF TENNESSEE.

CLUTCH.

No. 904,358.     Specification of Letters Patent.     Patented Nov. 17, 1908.

Application filed November 16, 1907, Serial No. 402,563. Renewed September 25, 1908. Serial No. 454,775.

*To all whom it may concern:*

Be it known that I, CARL T. PAINTER, a citizen of the United States, residing at Chattanooga, in the county of Hamilton and State of Tennessee, have invented new and useful Improvements in Clutches, of which the following is a specification.

This invention relates to clutches.

A clutch involving my invention is simple in construction, effective in action, and can be inexpensively made. Said clutch involves other advantageous features which with the foregoing will be set forth at length in the following description wherein is disclosed in detail that form of embodiment of the invention which I have selected for illustration in the drawings accompanying and forming part of this specification; the novelty of the invention will be included in the claims succeeding said description.

Referring to said drawings: Figure 1 is a side elevation of said clutch with part of the arm thereof broken away and with the supporting shaft for the hub of said arm and the sleeve supported by said shaft in section. Fig. 2 is a transverse section of one of the clutch halves or members. Fig. 3 is a persepective view of the other clutch half or member, and Fig. 4 is a like view of the clutch-operating member.

Like characters refer to like parts throughout the several figures.

The present clutch is of the same type as that covered in Letters Patent No. 870,381 granted to me November 5, 1907, and to which reference may be had, and it involves a divided ring which preferably is resilient or of springy character. Said ring is adapted to be circumferentially enlarged to put the same into engagement with a wheel or equivalent part, the ring constituting one member of the clutch and the wheel the other. When the expanding pressure is relieved from the ring the latter, by its own action, contracts so as to put the clutch into its inoperative relation. Clutches of the type mentioned are advantageous. There is apt, however, to be a breakage of certain of the parts if the divided or split ring be applied suddenly or with violent friction against the coöperating wheel with clutches of the kind alluded to which are ordinarily in use, this being due to a rigid or stiff connection between the operating member and the ring. I interpose between the operating member and the ring improved and simple yieldable power-transferring means which, notwithstanding the fact that said operating member may be moved at an accelerated rate of speed or violently, prevents injury to any of the parts and causes the divided ring to engage the wheel without possibility of injury or breakage.

In Fig. 1 of the drawings I have shown a supporting shaft 2. This supporting shaft 2 is represented as loosely carrying the wheel 3 which is provided with a lateral flange or rim 4 adapted to inclose a divided or split, resilient or spring ring 5. To one end of the ring 5 is connected an arm as 6 which is disposed radially of said ring and which terminates at its inner end in an elongated hub as 7 adapted to be keyed or otherwise suitably fastened to the shaft 2 for rotation therewith. By expanding the ring 5 into frictional engagement with the interior surface of the flange or rim 4 said ring will be clutched to the wheel 3. On relieving the ring 5 from the action which tends to expand it said ring will automatically contract so as to unclutch the wheel 3 from the shaft 2. As will hereinafter appear I apply a yielding force to the ring 5 for expanding the same. The hub 7 slidingly receives the sleeve or tube 8 which at its opposite ends is provided with notches 9 and 9', the notch 9 being adapted to receive the arm 6 for the purpose of rotatively connecting the sleeve 8 and the ring 5 during the longitudinal movement of said sleeve. The notch 9' receives an arm of a second clutch ring not shown in the drawings. The ring 5, inwardly extending arm 6, and hub 7 may, if desired, be made in one piece, for example, by casting.

The arm 6 is shown as pivotally supporting as at 10 a lever as 11 which lever extends through a transverse slot as 12 in said arm 6. The outer end of the lever 11 is adapted to expand the clutch ring 5, although it does not, as in the patent, directly engage said ring, as will hereinafter appear. Said outer end has a play in opposite and registering notches in the ends of the ring 5. The outer end of said lever in the present case engages the toe of a yieldingly mounted lever as 13 pivotally supported between ears as 14 in proximity to the free end of the divided resilient ring 5. This lever 13 is shown as so mounted as to produce long and short branches, the toe or that part thereof which is engaged by the expanding lever 11 being on the short branch. A rod is shown at 15, said rod being represented as having a conical head countersunk in an opening through the ring 5, said rod extending inwardly substantially radially of the ring and through the long branch or arm of the lever 13. Around the rod 15 is shown a coiled push spring 16, the outer end of which bears against a washer as 17 surrounding said rod, while the inner end thereof rests against a shoulder or collar as 18 on said rod, which shoulder or collar may consist of a nut threaded on the rod whereby adjustability is obtained for the purpose of regulating the tension of the spring. The lever 13 is illustrated as provided with a knife-edge portion 19 resting against the washer 17. It will therefore be evident that the spring 16 acts against the lever 13 to hold the same yieldingly in position. It is assumed that the spring or resilient ring 5 is contracted in Fig. 1, the periphery thereof being out of contact with the rim 4, so that there is no driving connection between said ring and rim. To clutch these parts what is shown as the lower arm of the lever 11 is swung to the right in Fig. 1 whereby the outer or upper arm of said lever 11 by acting against the toe of the lever 13 can oscillate the said lever 13 in such a way as to swing the long arm thereof inward, thereby compressing the spring, and, as said lever 13 is carried by the ring 5, it is clear that said ring 5 will be put into frictional contact with the rim 4 when sufficient thrust is given outwardly to the inner arm of the lever 11. The force therefore acting to expand the ring 5 is a yieldable one.

I have shown as tapped through the tail of the lever 13 an adjusting screw 20, the outer end of the screw being adapted to engage against a boss or lug as 21 on the inner side of the ring 5. By turning said screw to the right the lever 13 may be so adjusted as to force the toe thereof solidly into engagement with the outer end of the lever 11, this being for the purpose of taking up wear between the two levers. The adjustment may be maintained by a check-nut as 21′ on the screw 20.

The inner arm of the lever 11 is represented as provided with an anti-friction roll 22 adapted to be engaged by a wedge as 23 on the sleeve 8 for the purpose of operating said lever 11 in a direction to cause the circumferential enlargement of the ring 5. To the extreme inner end of the lever 11 is connected one end of a spring 24, the outer end of said spring being connected with the ring 5, said spring 24 serving to retract the lever 11 when it has been freed from the action of the wedge 23 and to also aid in the contraction of the ring 5. On the sleeve 8 is a second wedge 23′ (see Fig. 4) which acts in connection with a lever such as that denoted by 11 on a second clutch not shown. The two wedges 23 and 23′ are alike in construction and they act precisely as fully disclosed in the said Letters Patent.

It will be clear that the expanison of the ring 5 is obtained from the spring 16, by virtue of which finely graduated pressures between the ring 5 and rim 4 can be obtained and I therefore can within certain limits obtain a variable speed. By regulating the tension of said spring I can govern the amount of pressure between the driving and driven parts of the clutch. By increasing the tension of a spring a little beyond that required to obtain a clutching effect I can compensate for any wear between the driving and driven parts. The presence of the screw 20 provides for accurate contact between the levers 11 and 13 and avoids any lost motion between these two parts in that, when there is any indication of any such lost motion, the same can be at once taken up by the adjustment of said screw 20.

It will be obvious from what has been hereinbefore stated that my clutch comprises a divided ring whether the same be of resilient or other form, a lever associated with said ring, an actuating device to operate the lever to expand the ring, and adjusting means for the lever to hold the same in proper relation with said actuating device. In the present case the screw 20 hereinbefore described constitutes an advantageous form of adjusting means for the purpose set forth, this screw serving to maintain such an engagement between the levers 13 and 11 as to insure proper action of the ring 5, this construction being of especial utility when employed in connection with apparatus such as that disclosed in Letters Patent No. 870,458 granted to me November 5, 1907. In said apparatus there are two sheaves such as 3 with which rings as 5 are coöperative. In addition to this, brake mechanism acts against said sheaves, the brake mechanism being in action when the clutches are out of action. Around the sheaves are passed cables connected to an elevator or platform. There are times, owing to wear between the two levers, that, when the brake mechanism is thrown out of action, the clutches do not instantly act, the consequence being that, when the brake mechanism is thrown off, there will be an interval of time before a clutch is active and in this interval the platform is apt to drop. The clutches are alternately effective. This difficulty can be wholly eliminated by the operation of the screw 20 which can so gage the contact between the lever 13 and the lever 11 that the instant the brake mechanism is out of action, the ring 5 becomes effective to clutch the coöperating sheave 3.

What I claim is:

1. A clutch comprising a divided ring, a lever pivotally suported by said ring, spring means acting against the lever at one side of its pivot, and means to directly engage said lever and shift the same in opposition to the spring means to expand the ring.

2. A clutch comprising a divided ring provided with an arm, a yieldingly mounted lever carried by said ring, and a lever carried by said arm for actuating the first mentioned lever in a direction to expand said ring.

3. A clutch comprising a divided ring, a lever supported by said ring, a rod, a spring encircling the rod and acting against the lever to hold the same yieldingly in position, and means acting against said lever to expand said ring.

4. A clutch comprising a divided ring, a lever pivotally supported by said ring, a spring acting against the lever at one side of its pivot, means directly engaging the lever to shift the same in opposition to the spring to expand the ring, and means to adjust the contact between the lever and the means which acts against said lever.

5. A clutch comprising a divided ring, a member movably carried by said ring for swinging movement, a spring acting against said member, and a movable actuating device to directly engage the said member in opposition to the spring to expand the ring.

6. A clutch comprising a divided ring, a lever carried for swinging movement by said ring, a spring acting against said lever, a second lever for directly engaging the first lever in opposition to the spring and operating to expand the ring, and screw means coöperative with the first lever for adjusting the contact between the latter and the second lever.

7. A clutch comprising a divided ring, a lever carried for swinging movement by said ring, a spring acting against the lever, and a second lever for directly engaging the first lever and for shifting the latter in opposition to the spring to thereby expand said ring.

8. A clutch comprising a divided ring, a lever supported for swinging movement by said ring, a spring acting against said lever, a second lever for directly engaging the first lever in opposition to the spring and for shifting said first lever to thereby expand said ring, and a screw for adjusting the contact between the two levers.

9. A clutch comprising a divided ring, a lever supported by said divided ring, a rod connected with the ring and extending through the lever, a spring acting against the rod and lever respectively, and an adjusting screw tapped through the lever and engaging the ring.

10. A clutch comprising a divided ring, a lever pivotally carried by the ring for swinging movement, a second lever for directly engaging the first lever to expand the ring, and means for effecting a yielding expansion of the ring when the second lever engages the first lever.

11. A clutch comprising a divided ring, a lever pivotally supported by said ring, spring means acting against the lever at one side of its pivot, and means acting against the lever at the other side of its pivot to cause the expansion of said ring.

12. A clutch comprising a divided ring, a lever operatively connected with said ring, a second lever for directly engaging the first lever to thereby expand said ring, means for effecting a yielding expansion of the ring when the second lever thus acts against the first lever, and means for adjusting the contact between the two levers.

In testimony whereof I have hereunto set my hand in presence of two subscribing witnesses.

CARL T. PAINTER.

Witnesses:
 LEWIS M. COLEMAN,
 W. S. BECK.